United States Patent
Maria

(10) Patent No.: US 7,934,090 B2
(45) Date of Patent: *Apr. 26, 2011

(54) SYSTEM FOR SECURING INBOUND AND OUTBOUND DATA PACKET FLOW IN A COMPUTER NETWORK

(75) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/149,991

(22) Filed: May 12, 2008

(65) Prior Publication Data

US 2008/0263639 A1  Oct. 23, 2008

Related U.S. Application Data

(63) Continuation of application No. 09/314,330, filed on May 19, 1999, now Pat. No. 7,373,655.

(60) Provisional application No. 60/113,495, filed on Dec. 22, 1998.

(51) Int. Cl.
*H04L 29/06* (2006.01)
*G06F 15/16* (2006.01)
*G06F 17/30* (2006.01)

(52) U.S. Cl. ........ 713/160; 713/153; 713/154; 713/155; 713/170; 726/1; 726/2; 726/3; 726/4; 726/6; 726/8; 726/12; 726/13; 726/15; 726/27; 726/28; 726/29; 709/219; 709/223; 709/224; 709/225; 709/226; 709/229

(58) Field of Classification Search .................. 713/160; 726/15, 3, 27–29; 709/229
See application file for complete search history.

(56) References Cited

U.S. PATENT DOCUMENTS

| | | | |
|---|---|---|---|
| 4,969,092 A * | 11/1990 | Shorter | 718/102 |
| 4,991,089 A | 2/1991 | Shorter | |
| 5,001,628 A | 3/1991 | Johnson et al. | |
| 5,063,500 A * | 11/1991 | Shorter | 709/226 |
| 5,201,049 A * | 4/1993 | Shorter | 718/1 |
| 5,321,841 A | 6/1994 | East et al. | |
| 5,689,708 A | 11/1997 | Regnier et al. | |
| 5,802,590 A * | 9/1998 | Draves | 711/164 |
| 5,881,225 A * | 3/1999 | Worth | 726/17 |
| 5,917,997 A * | 6/1999 | Bell et al. | 714/4 |
| 5,918,019 A * | 6/1999 | Valencia | 709/227 |
| 5,974,566 A * | 10/1999 | Ault et al. | 714/15 |
| 6,000,033 A | 12/1999 | Kelley et al. | |

(Continued)

OTHER PUBLICATIONS

Dix, John, "Constellations of software teams," Network World, Jan. 22, 1996, p. 17 (4 pages).

*Primary Examiner* — Edan Orgad
*Assistant Examiner* — Jenise E Jackson
(74) *Attorney, Agent, or Firm* — Myers Bigel Sibley & Sajovec

(57) ABSTRACT

A method provides for control of access to network resources. A virtual identity machine resides in the network and is pre-authorized to access certain network resources. End users desiring access to those network resources attempt to logically connect to the virtual identity machines. If the logical connection attempt is successful, then the end user assumes the virtual identity of the virtual identity machine and has access to all of the same information that was available to the virtual identity machine.

18 Claims, 3 Drawing Sheets

U.S. PATENT DOCUMENTS

| | | | |
|---|---|---|---|
| 6,009,103 A * | 12/1999 | Woundy | 370/401 |
| 6,055,575 A | 4/2000 | Paulsen et al. | |
| 6,058,426 A | 5/2000 | Godwin et al. | |
| 6,088,805 A * | 7/2000 | Davis et al. | 726/10 |
| 6,275,953 B1 | 8/2001 | Vahalia et al. | |
| 6,367,009 B1 | 4/2002 | Davis et al. | |
| 6,490,624 B1 * | 12/2002 | Sampson et al. | 709/227 |
| 6,496,847 B1 | 12/2002 | Bugnion et al. | |
| 6,560,461 B1 * | 5/2003 | Fomukong et al. | 455/456.2 |
| 6,633,977 B1 | 10/2003 | Hamilton et al. | |
| 6,748,420 B1 * | 6/2004 | Quatrano et al. | 709/205 |
| 6,795,967 B1 | 9/2004 | Evans et al. | |
| 6,917,279 B1 | 7/2005 | Thomas et al. | |
| 2001/0042135 A1 | 11/2001 | Lewis | |

* cited by examiner

SYSTEM FOR SECURING INBOUND AND OUTBOUND DATA PACKET FLOW IN A COMPUTER NETWORK

CROSS REFERENCE TO RELATED APPLICATION

This is a continuation of application Ser. No. 09/314,330 filed 19 May 1999, now U.S. Pat. No. 7,373,655, which claims priority to provisional application No. 60/113,495 filed 22 Dec. 1998, the contents of which are incorporated herein by reference in their entirety.

The present invention claims priority to provisional application Ser. No. 60/113,495 entitled "System for Securing Inbound and Outbound Data Packet Flow in a Computer Network", the entire disclosure of which is hereby incorporated by reference.

TECHNICAL FIELD

The present invention is directed to a method and apparatus for providing authorization to access network resources. More specifically, the present invention is directed to a method and apparatus for providing an improved authorization process for accessing network resources.

BACKGROUND OF THE INVENTION

The ways in which people exchange information have been dramatically changed by the continued evolution of data communication capabilities. Today, more and more individuals have access to data networks by which they obtain news, entertainment and business information. In fact, as the data communication capabilities have increased, commerce along the data communication networks has appeared and increased as well. Today, the wide area network commonly referred to as the Internet provides its users with access to almost incomprehensible amounts of information.

FIG. 1 shows, in a schematic way, a network orientation in which a user 10 may attempt to get information from servers 15 and 20 via a wide area network (WAN) 50. In this arrangement the user, via a terminal device such as a PC 60, can connect to a gateway into the wide area network, here shown as Internet service provider (ISP) 40. Typically, the user's terminal facility is connected to the ISP via a standard telephone network 30 such as the Public Switched Telephone Network (PSTN). Other configurations are possible where direct connections into the ISP or into the wide area network are available. In this arrangement either one of the servers, or both, may desire to either charge for access to the information on the server or limit the access to information on the server based on some predetermined criteria. For example, server 15 may provide an on-line version of a particular publication. The producer of the publication may desire to limit access to the publication to only those users willing to pay a subscription fee for the publication. Whenever the server decides to limit access to its resources, it must provide some facility by which it can authorize and/or authenticate a user who wishes to access a given resource. Typically today, each server that wishes to limit access to its resources must also provide a separate authentication/authorization facility. This is represented in each of the servers illustrated in FIG. 1. This arrangement creates a tremendous burden for those who wish to limit access to the resources. As the number of subscribers grows, the authentication and authorization facility resource for each server must be adapted to this growth. It also requires each individual who wishes to limit access to somehow incorporate additionally complex application software at additional cost to limit the access in the manner desired.

One alternative to this configuration has been presented by enCOMMERCE with an authorization program referred to as GetAccess. In this arrangement, a centralized server includes an authorization database. Even though some of the facilities are centralized, each location interacting with GetAccess requires its own server to load a GetAccess interface and to communicate with the central facility in such a manner as to build its own authorization table with the aid of the centralized facility. While this off-loads some of the responsibility for some of the authorization, it still requires complex interactions between the end servers and the centralized authority as well as the loading of authorization information at individual servers that are seeking to limit access to their resources.

It would be desirable to provide a technique by which the end point service providers or resource providers could off-load substantially all responsibility for authorizing and authenticating access-requesting users in a manner which does not overly tax the resource providers or the communication network.

SUMMARY OF THE INVENTION

The present invention provides a method for controlling access to network resources by allowing prospective users to assume the identities of pre-authorized machines. In accordance with an embodiment of the present invention, a user seeking access to a particular network resource connects to a stateful virtual identity machine (SVIM). The machine is capable of authorizing the end user. The machine, having authorized an end user, shares its identity with the end user. As a consequence, the authorized user assumes the identity of the machine and appears to the network as if it were that machine. Since the network resource in question has pre-authorized a machine, this pre-authorization extends to each end user that assumes the virtual-identity of the machine. The authorization process at the stateful virtual identity machine can be as simple as considering an end user authorized simply by virtue of the fact that they have physically accessed the SVIM, as would be the case in a place where the SVIM is maintained in a secure location and physical access is limited to only permitted users. Alternatively, the SVIM could include a table or tables and receive a key or keys of some number of bits in length from the end user device. The received key would be checked against the logical table and the end user would assume the identity of the machine if the received key or virtual identity character (VIC) matches any content in the logical table in the SVIM.

DETAILED DESCRIPTION

The present invention is based on a different philosophy for managing access to resources. In contrast to the prior art systems where each individual server would maintain its own authorization capabilities, and in contrast to a co-pending application by the present inventor, entitled "Method and Apparatus for Providing Centralized URL Authorization," based on Ser. No. 60/113,493, filed on Dec. 22, 1998, in which a centralized authentication facility is provided, the present invention is directed to a system in which authorization is provided by some intermediate mechanism. In particular, it has been recognized that it is beneficial to provide one or more pre-authorized machines whereby the machine by nature of its identity is permitted access to various network resources which would be inaccessible given a different identifier. In accordance with the present invention, if any other user of the system is permitted to assume or is assigned the identity of the pre-authorized machine, then that user will also have all of the access capabilities associated with the pre-authorized machine. In this way the present invention provides an element referred to as a stateful virtual identity machine (SVIM) which is pre-authorized to access network resources. An end user desiring to access the very same network resources can connect itself to the SVIM, and, if the connection is allowed, the end user assumes the identity of the SVIM such that the connected end user has all of the access privileges assigned to the SVIM.

Figure 1:
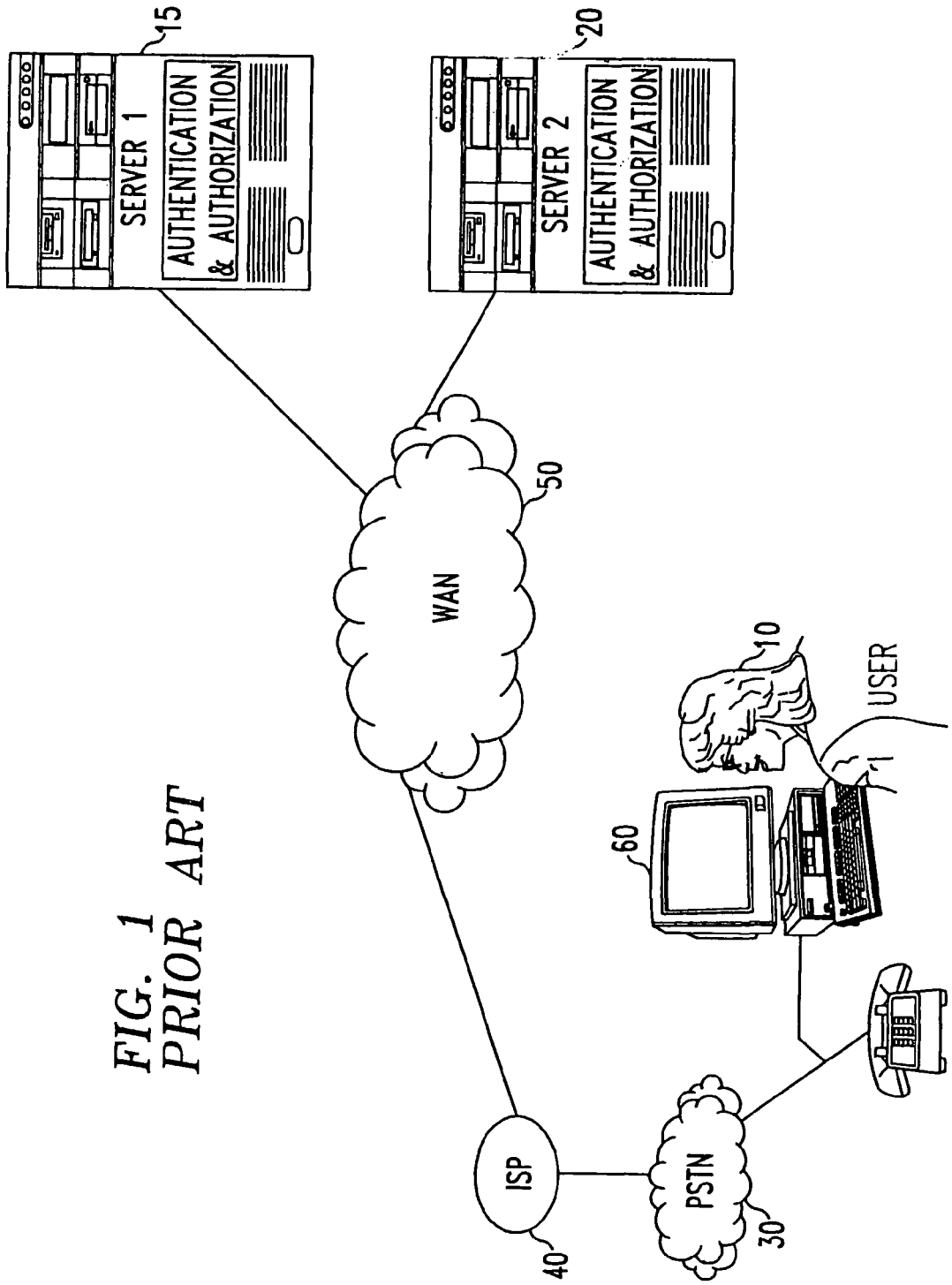
FIG. 1 illustrates a schematic view of a prior art communication system.
Figure 2:
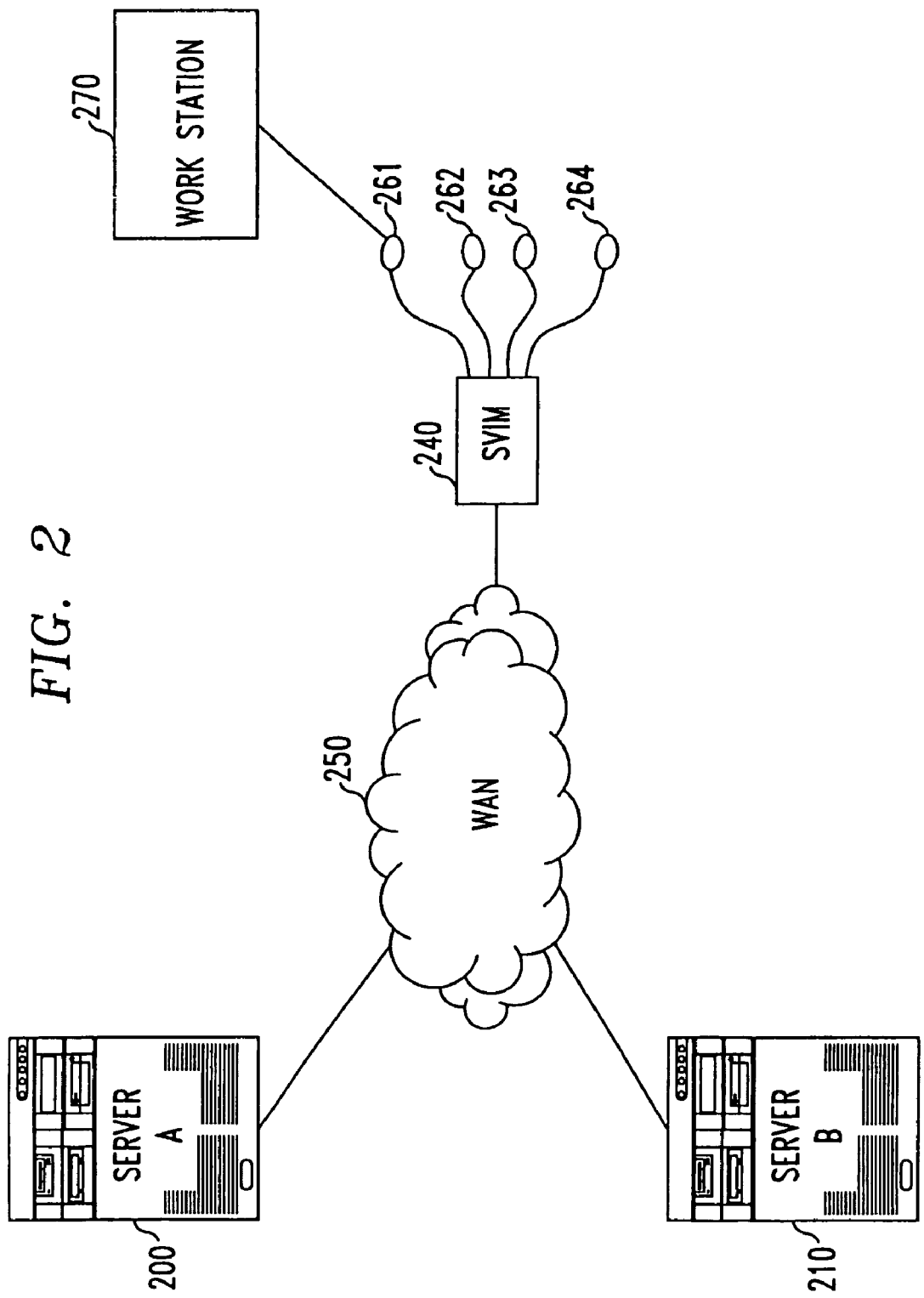
FIG. 2 illustrates a schematic view of a system in which an embodiment of the present invention may be incorporated.

An example of a system in which the present invention may be deployed is illustrated in FIG. 2. This figure illustrates two servers, server A, 200 and server B, 210. Both of the servers are connected to a wide area network (WAN) 250. A network node, a stateful virtual identity machine (SVIM) 240, is also connected to the wide area network. It should be noted that the term "connected" is intended to encompass direct and indirect connections so that it is possible for the servers or the SVIM to be connected into the wide area network via intermediate network elements or nodes. The SVIM has a plurality of logical ports, here illustrated as ports 261 to 264. A work station 270, utilized by an end user, can be connected to one of the logical ports of the SVIM.

The SVIM is pre-authorized to have access to certain network resources. For example, perhaps the SVIM is associated with the service provider at server A. That SVIM then may have access privileges to some or all of the resources of server A. In accordance with the present invention, the SVIM analyzes whether any of the devices which attempt to connect to one of its logical ports should be allowed to do so. This can be done by checking a virtual identity characteristic (VIC) provided by the work station, for example, to the SVIM. In one embodiment, the VIC can be a key or work station identifier that is inserted in the layer-two headers of data transmission between the end user and the SVIM. These VICs would be inserted either by the manufacturer of the end user machine, for example the work station or other devices such as a PC or cellular telephone, or could be inserted by software programs which are designed to synchronize end user VICs with VICs contained in the SVIM. If the SVIM in response to the VIC determines that the end user machine, here workstation 270, is allowed to connect to the SVIM, then the end user assumes the virtual identity of the SVIM. Security profiles contained on security databases permit only those entities having the identity of the SVIM to access the resource. As a consequence, the SVIM can act as something of a concentrator of end user requests out in the network and can select those end users which will be permitted to assume the virtual identity of a machine that is pre-authorized to have access to particular network resources. This configuration significantly reduces the load on security operations at the server itself and localizes security out in the network nearer to the end users seeking access to the network resources.

The SVIM are considered "stateful" in that in the configuration described with respect to FIG. 2, the SVIM can remember whether a particular end user is connected to the SVIM or not. It keeps track of the "state" of the connection between any given end user and the SVIM.

Figure 3:
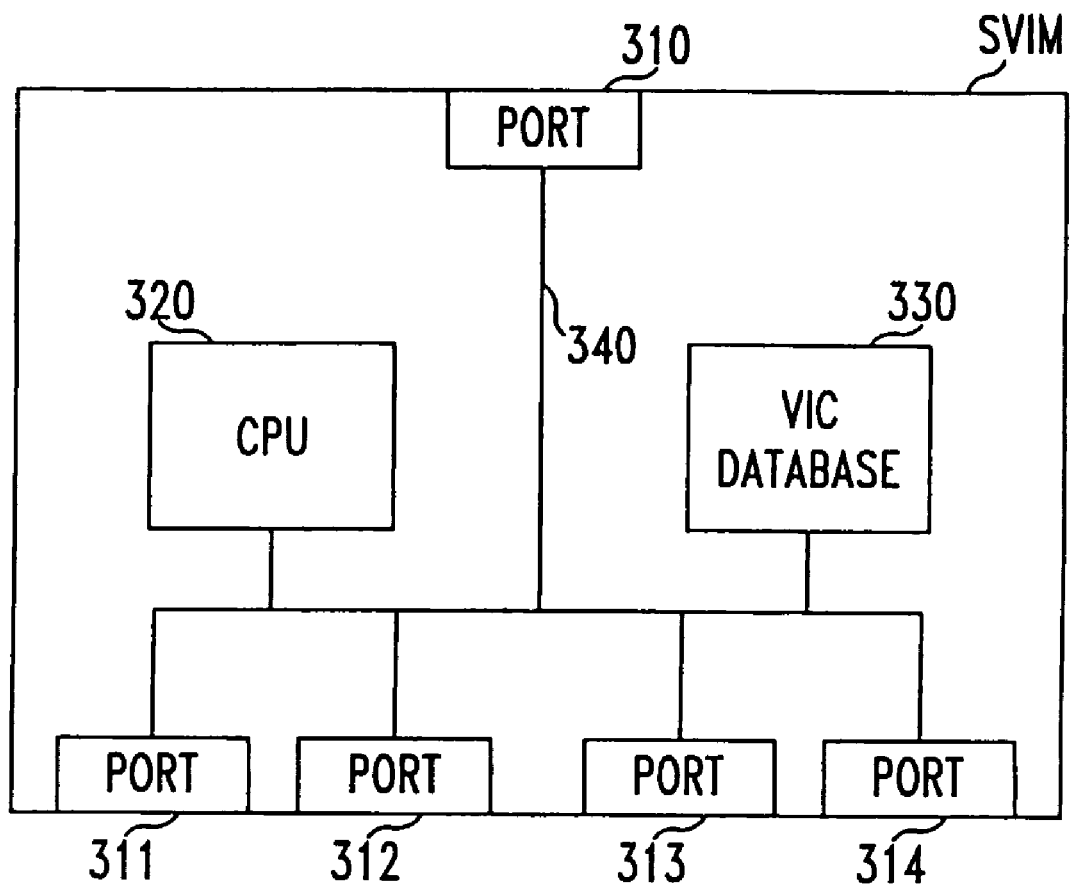
FIG. 3 illustrates in block diagram form an element from the system of FIG. 2.

An embodiment of the SVIM is shown in block diagram form in FIG. 3. The device includes a processor, CPU 320, operating under control of programs stored in memory, such as VIC database 330. That same database can contain authorization information for implementing whether an end user can assume the virtual identity of the SVIM. The database can maintain authorization information in tabular form for example, such as in an access table that identifies whether a given user is authorized to assume the machine's identity. The table could correlate user identifications with various resources, also having identifiers, accessible via the machine. Port 310 can be coupled to WAN as shown in FIG. 2 while ports 311 to 314 can correspond to ports 261 to 264 in FIG. 2. The ports, CPU and database can be coupled in an internal network configuration using a data bus 340.

Authorization of a given end user to assume the virtual identity of the SVIM may come from a more implicit activity than the exchange of keys or VIC information. More specifically, it is possible that a particular SVIM may be positioned in a secure location such that only end users who have access to the secured location will be able to avail themselves of the use of the SVIM. In such a circumstance, it is the physical access to the SVIM which creates the presumption that the end user is an authorized user from the perspective of the SVIM. Even in this circumstance, though, the end user, assumes the virtual identity of the SVIM for all purposes.

In this invention, then, the network resources do not worry about the true identity of the end user. Instead, all that is of significance to the network resource's security capabilities is that the end user has assumed the identity of the SVIM to which it is logically or physically connected.

In accordance with the present invention, security capabilities localized with a server providing network resources can be modestly maintained by simply keeping track of the virtual identity machines which reside in the network and are pre-authorized to access network resources. The SVIM then assume the responsibility, out in the connection points of the network, of identifying appropriate end users. If it is desirable to provide access for more users the additional SVIMs could be provided, the memory or logic tables of the SVIMs could be expanded or both.

This invention could have applicability not only in the context of services providing, for example, web site or web page information, but in connection with other services which might be accessed via data networks. It is applicable in any environment in which an end user can be logically connected to a machine pre-authorized to have access to network resources and assume virtual identity of that machine.

The disclosed embodiments are illustrative of the various ways in which the present invention may be practiced. Other embodiments can be implemented by those skilled in the art without departing from the spirit and scope of the present invention.

What is claimed is:

1. A method for providing access to a network resource, comprising:

receiving, at a network node that is pre-authorized to access the network resource, a request to allow a first user to assume an identity of the network node, the network node that is pre-authorized having a plurality of access privileges associated therewith;

allowing the first user to assume the identity of the network node that is pre-authorized, such that the first user appears to the network resource to be the network node that is pre-authorized, after verifying that the first user is authorized; and based on the first user assuming the identity of the network node that is pre-authorized, allowing the first user to access the network resource using the plurality of access privileges associated with the network node that is pre-authorized.

2. The method of claim 1 further comprising:

receiving, at the network node, a request to allow a second user to assume the identity of the network node;

allowing the second user to assume the identity of the network node that is pre-authorized after verifying that the second user is authorized, and based on the second user assuming the identity of the network node that is pre-authorized, allowing the second user to access the network resource.

3. The method of claim 2, wherein the first and second users assume the identity of the network node that is pre-authorized during overlapping time periods.

4. The method of claim 1, wherein verifying that the first user is authorized includes:

receiving an identifier associated with the first user;

comparing the identifier received to a table of authorized identifiers; and determining whether the identifier received matches any of the authorized identifiers.

5. The method of claim 1, wherein verifying that the first user is authorized includes:

receiving a first identifier associated with the first user and a second identifier associated with a requested resource;

comparing the first identifier received and second identifier received to contents of an authorized memory; and determining that the first user is authorized to access the network resource if a match is found for the first and second identifiers in the memory.

6. The method of claim 1, wherein the network node is an internet service provider.

7. The method of claim 1, wherein the network resource is on the internet.

8. The method of claim 1, wherein the network node has a plurality of logical ports through which the request may be received.

9. A computer program product configured to provide access to a network resource, comprising a non-transitory computer readable medium having computer readable program code embodied therein, the computer readable program product comprising:

computer readable program code configured to receive a request to allow a first user to assume an identity of a network node that is pre-authorized to access the network resource, the network node that is pre-authorized having a plurality of access privileges associated therewith;

computer readable program code configured to verify that the first user is authorized, and to allow the first user to assume the identity of the network node that is pre-authorized, such that the first user appears to the network resource to be the network node that is pre-authorized, after verifying that the first user is authorized; and computer readable program code configured to allow the first user to access the network resource using the plurality of access privileges associated with the network node that is pre-authorized, based on the first user assuming the identity of the network node that is pre-authorized.

10. The computer program product of claim 9, further comprising:

computer readable program code configured to receive a request to allow a second user to assume the identity of the network node;

computer readable program code configured to allow the second user to assume the identity of the network node that is pre-authorized after verifying that the second user is authorized, and computer readable program code configured to allow the second user to access the network resource, based on the second user assuming the identity of the network node that is pre-authorized.

11. The computer program product of claim 10, further comprising computer readable program code configured to allow the first and second users to assume the identity of the network node that is pre-authorized during overlapping time periods.

12. The computer program product of claim 9, wherein the computer readable program code configured to verify that the first user is authorized includes:

computer readable program code configured to receive an identifier associated with the first user;

computer readable program code configured to compare the identifier received to a table of authorized identifiers; and computer readable program code configured to determine whether the identifier received matches any of the authorized identifiers.

13. The computer program product of claim 9, wherein the computer readable program code configured to verify that the first user is authorized includes:

computer readable program code configured to receive a first identifier associated with the first user and a second identifier associated with a requested resource;

computer readable program code configured to compare the first identifier received and second identifier received to contents of an authorized memory; and computer readable program code configured to determine that the first user is authorized to access the network resource if a match is found for the first and second identifiers in the memory.

14. A computer system comprising:

a network resource; and a network node that is pre-authorized to access the network resource and having a plurality of access privileges associated therewith;

wherein the network node is configured to receive a request to allow a first user to assume an identity of the network node, to verify that the first user is authorized, and to allow the first user to assume the identity of the network node, such that the first user appears to the network resource to be the network node that is pre-authorized, and wherein the network resource is configured to allow the first user to access the network resource using the plurality of access privileges associated with the network node that is pre-authorized, based on the first user assuming the identity of the network node.

15. The computer system of claim 14, wherein the network node is further configured to receive a request to allow a second user to assume the identity of the network node, to verify that the second user is authorized, and to allow the second user to assume the identity of the network node, such that the second user appears to the network resource to be the network node that is pre-authorized, and wherein the network resource is further configured to allow the second user to access the network resource using the plurality of access privileges associated with the network node that is pre-authorized, based on the second user assuming the identity of the network node.

16. The computer system of claim 15, wherein the network node is further configured to allow the first and second users to assume the identity of the network node that is pre-authorized during overlapping time periods.

17. The computer system of claim 14, wherein the network node that is configured to verify that the first user is authorized is further configured to receive an identifier associated with the first user, to compare the identifier received to a table of authorized identifiers, and to determine whether the identifier received matches any of the authorized identifiers.

18. The computer system of claim 14, wherein the network node that is configured to verify that the first user is authorized is further configured to receive a first identifier associated with the first user and a second identifier associated with a requested resource, to compare the first identifier received and second identifier received to contents of an authorized memory, and to determine that the first user is authorized to access the network resource if a match is found for the first and second identifiers in the memory.

* * * * *